US009878682B2

(12) United States Patent
Pierce et al.

(10) Patent No.: US 9,878,682 B2
(45) Date of Patent: *Jan. 30, 2018

(54) MULTIPLE VEHICULAR CHARGE SOURCES AND LOADS

(71) Applicant: eNOW, Warwick, RI (US)

(72) Inventors: Philip R. Pierce, Fernandina Beach, FL (US); Robert Doane, Harwich, MA (US); Jeffrey C. Flath, Warwick, RI (US); Stephen Lasher, Warwick, RI (US)

(73) Assignee: ENOW, Inc., Warwick, RI (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/730,758

(22) Filed: Jun. 4, 2015

(65) Prior Publication Data

US 2015/0353036 A1     Dec. 10, 2015

Related U.S. Application Data

(60) Provisional application No. 62/008,185, filed on Jun. 5, 2014, provisional application No. 62/016,905, filed on Jun. 25, 2014.

(51) Int. Cl.
| | |
|---|---|
| *B60R 16/033* | (2006.01) |
| *B60L 11/18* | (2006.01) |
| *H02J 7/35* | (2006.01) |
| *H02J 7/00* | (2006.01) |
| *H02J 3/38* | (2006.01) |

(52) U.S. Cl.
CPC ......... *B60R 16/033* (2013.01); *B60L 11/1811* (2013.01); *B60L 11/1861* (2013.01); *H02J 7/0054* (2013.01); *H02J 7/35* (2013.01); *H02J 3/385* (2013.01); *Y10T 307/344* (2015.04)

(58) Field of Classification Search
CPC ....... H02J 7/0054; H02J 3/385; B60R 16/033; B60L 11/1811; B60L 11/1861
See application file for complete search history.

(56) References Cited

U.S. PATENT DOCUMENTS

| | | | | |
|---|---|---|---|---|
| 2010/0116565 | A1* | 5/2010 | Jang | H02S 40/38 |
| | | | | 180/2.2 |
| 2014/0116077 | A1* | 5/2014 | Pierce | B60L 1/02 |
| | | | | 62/235.1 |
| 2015/0188360 | A1* | 7/2015 | Doane | H02J 7/35 |
| | | | | 307/9.1 |

\* cited by examiner

*Primary Examiner* — Robert Deberadinis
(74) *Attorney, Agent, or Firm* — Chapin IP Law, LLC

(57) ABSTRACT

A charge controller for a vehicle passive energy system employs an interface to a plurality of charge sources including intermittent sources, such as vehicle mounted solar photovoltaic (PV) panels and the vehicle engine and alternator, and an interface to a plurality of charge loads, such as a comfort heating ventilation, refrigeration and air conditioning (HVAC) system and auxiliary vehicle loads. Charge logic computes which of the plurality of sources will supply the charge current and which of the plurality of loads will receive the charge current, and a switch responsive to the charge logic will direct the charge current from at least one of the plurality of sources to at least one of the loads, the plurality of charge sources mutually exclusive from simultaneously powering a common load.

20 Claims, 4 Drawing Sheets

US 9,878,682 B2

MULTIPLE VEHICULAR CHARGE SOURCES AND LOADS

RELATED APPLICATIONS

This application claims the benefit under 35 U.S.C. § 119(e) of U.S. Provisional Patent Application No. 62/008,185, filed Jun. 5, 2014, entitled "SYSTEM AND METHOD FOR MULTIPLE CHARGE SOURCES," and U.S. 62/016,905, filed Jun. 25, 2014, entitled "SYSTEM AND METHOD FOR MULTIPLE CHARGE SOURCES," both incorporated herein by reference in entirety.

BACKGROUND

Fossil fuel alternatives have come to light in recent years as the practical limits and eventual exhaustion of natural resources are considered. Tractor trailer trucks, being a leading consumer of fossil fuels and major contributor of combustion pollutants, have received particular scrutiny. Further, hybrid vehicle technology, gaining increasing popularity with smaller, consumer oriented vehicles, have yet to be adopted for larger vehicles, partially due to the limits of gathering and storing electrical energy on a scale sufficient for such larger vehicles. Solar energy, however, has been viewed as a viable contributor for ancillary vehicle loads over the native vehicle propulsion system (i.e. diesel engine). The flat, exposed surface of a trailer roof represents untapped surfaces for solar energy if strategically utilized and managed.

SUMMARY

A charge manager and controller for a vehicle passive energy system employs an interface to a plurality of charge sources including intermittent sources, such as vehicle mounted solar photovoltaic (PV) panels and the vehicle engine and alternator, and an interface to a plurality of charge loads, such as a comfort heating/ventilation, refrigeration systems and auxiliary vehicle loads. Charge logic computes which of the plurality of sources will supply the charge current and which of the plurality of loads will receive the charge current, and a switch responsive to the charge logic will direct the charge current from at least one of the plurality of sources to at least one of the loads, in which the plurality of charge sources may be mutually exclusive from simultaneously powering a common load due to differing electrical characteristics required by the load.

In the example configuration herein, the system for switching electrical sources in the vehicle electrical system includes a native vehicle electrical source and a passive electrical source, including charge logic for identifying differing electrical characteristics between a first power source and a second power source, and a controller for converting power corresponding to the electrical characteristics of the first power source to correspond to the characteristics of the second power source for charging the second storage element from the first power source. A switch in the controller is responsive to the charge logic for switching the converted power to the second storage element, such that unmatched power sources defined by differing electrical characteristics maintain electrical separation, to avoid common connection of dissimilar voltages. Therefore, the switch may permit shared or cross charging between the native vehicle and trailer (auxiliary) power systems while the sources remain mutually exclusive of simultaneously powering a common load.

Configurations herein are based, in part, on the observation that the vehicle alternator often exceeds the demands of storing electrical energy sufficient to operate the starter and other native loads such as headlights and fuel pumps/injectors. In effect, the alternator is typically capable of overcharging the starting battery, particularly on long trips where the engine is running long distances between starts. A modulator or regulator, such as a pulse width modulator (PWM), controls the charge current to the battery to avoid overcharging, however conventional approaches do not leverage this untapped source of potential electrical power.

Unfortunately, conventional approaches to vehicle based electrical energy management operate separate vehicle (tractor) and trailer (cargo storage) power systems. Conventional trailer loads, such as reefers, require a dedicated combustion engine and/or generator combination, and cannot benefit from potential excesses of the tractor engine alternator. Further, conventional trailers suffer from the shortcoming that they do not employ available passive energy sources such as roof mounted solar panels or regenerative brakes. Excess solar energy can be stored and utilized by the propulsion power system for powering non-essential loads such as comfort stations, rather than operating the propulsion engine solely for the electrical powering of the comfort station, such as a sleeper cab HVAC system. Accordingly, configurations herein substantially overcome the above described shortcomings by providing a dual charging approach where the propulsion power system and the auxiliary power system of the trailer can offset power (battery) exhaustion by transferring electrical power between the power systems using a smart switch to interconnect and share power by accommodating the differing electrical characteristics between the charging systems.

An auxiliary power source, such as a solar photovoltaic (PV) array, produces energy for non-propulsion auxiliary electrical loads and recharge auxiliary batteries. These auxiliary loads are supported by the propulsion power system (i.e., engine/alternator) during periods of underproduction if the propulsion system is on. When the propulsion system is not operating, the auxiliary loads are supported by an auxiliary battery system. Energy from the auxiliary power source is used to recharge the auxiliary battery system. In the case of a solar power source, a Maximum Power Point Tracking (MPPT) charging system would control the solar operating point at a voltage greater than the auxiliary battery voltage and charge the auxiliary battery using a combination of maximum current and controlled voltage algorithms. Alternatively, other mechanisms may be employed for adjusting charge voltages when the solar sources and vehicle sources have differing maximum voltages (i.e. 12v and 24/48v). This battery-charging scenario minimizes battery stress and overheating to achieve long-term battery lifetimes.

DETAILED DESCRIPTION

The current trend to conserve fossil fuel through less engine idling and the addition of an APS to support non-propulsive electrical loads in the transportation industry is well established. However, there remains a synergistic problem with the conservation of energy, especially for a solar power system application where the marginal power output is essentially free but intermittent. Modern propulsion systems include full time parasitic electrical loads and these loads (e.g. vehicle electronics, GPS and monitoring systems) will drain a primary battery (typically a vehicle starting battery) while the propulsion system is off. In many cases, a primary battery can be depleted in less than two weeks. When the propulsion system is on, the alternator supports the propulsion electrical load and charges the primary battery using a constant voltage PWM charging scheme.

Figure 1:
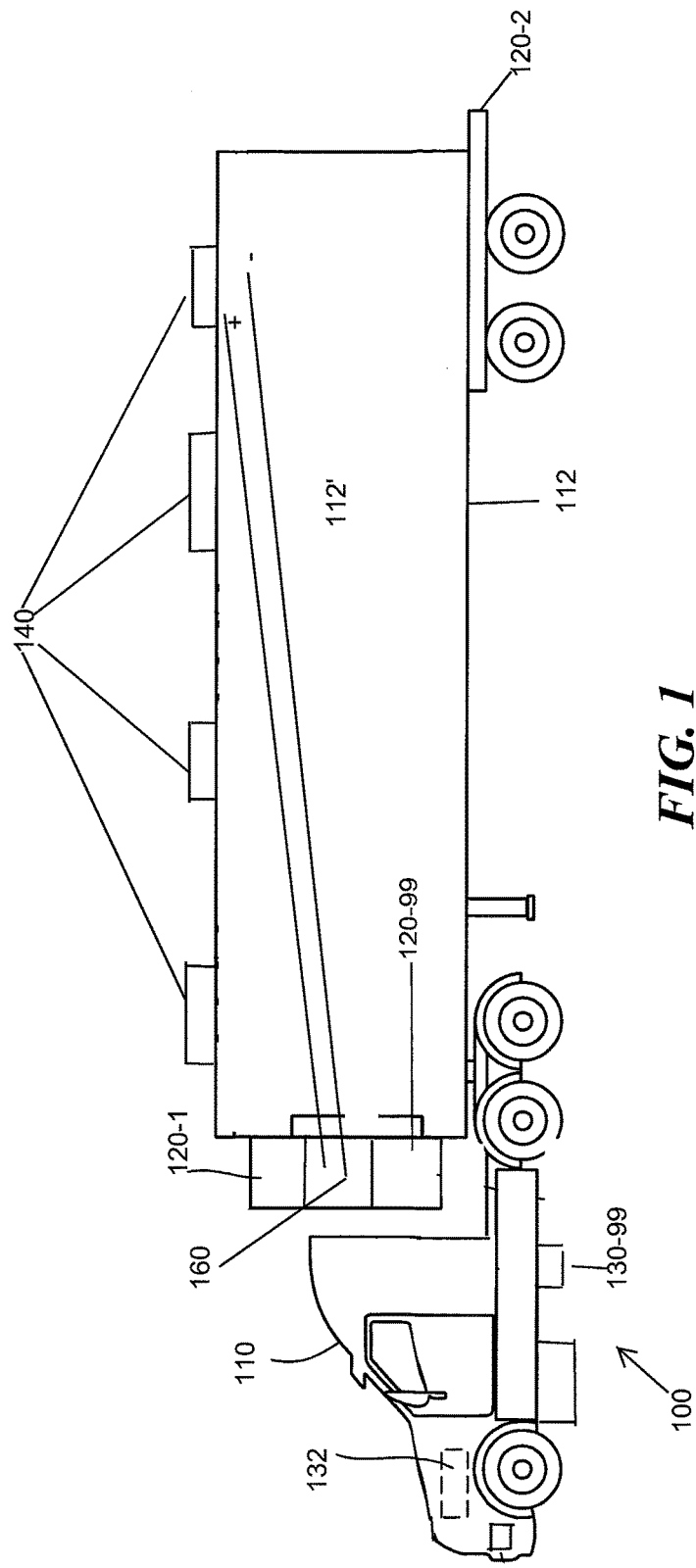
FIG. 1 is a context diagram of a vehicle suitable for use with the charging system as disclosed herein for a solar auxiliary power system (APS) application.

FIG. 1 is a context diagram of a vehicle suitable for use with the charging system as disclosed herein for a solar auxiliary power system (APS) application. Referring to FIG. 1, in a transport environment 100, a transport vehicle 110 such as a class 8 truck has a trailer 112 or other cargo area 112'. The trailer has a reefer (refrigerator) fan/compressor 120-1, liftgate 120-2, or other loads 120 (generally). A storage element such as a battery bank 120-99 stores power and is also a load 120 responsive to charging. The trailer loads 120 are generally focused on cargo transport and related demands.

The transport vehicle 110 employs a propulsion system (diesel engine) and a propulsion power system for powering native vehicle electrical loads, most notable a starter motor 130-1 for starting the diesel engine. The propulsion power system includes an alternator 132 for powering the propulsion vehicle loads such as the battery 130-99 and other loads 130 generally such as a comfort station (HVAC), lights, radio and cab communication systems. Various configurations and combinations of loads may be envisioned. If cooling demand allows, electrical energy may be employed to cool the reefer area of the trailer 112. The cab comfort station, common on long haul trucks for augmenting a sleeper cab arrangement, employs electrical power for HVAC functions, as well as entertainment and food preparation.

Figure 2:
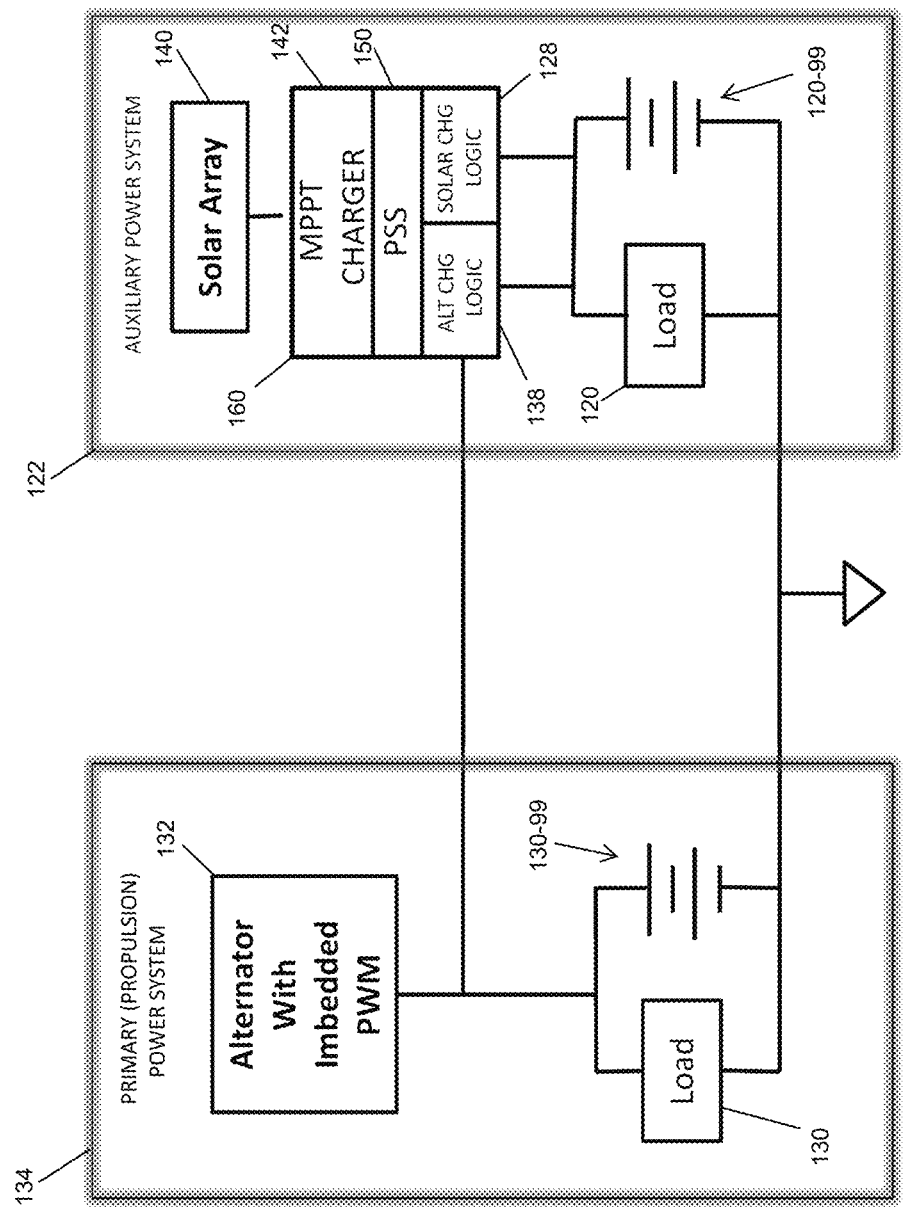
FIG. 2 is a block diagram of a charging system in the vehicle of FIG. 1.

FIG. 2 is a block diagram of a charging system in the vehicle of FIG. 1. Referring to FIGS. 1 and 2, the trailer, or cargo, loads 120 are powered by an auxiliary power system 122 separate from the propulsion power system 134. The auxiliary power system 122 receives power from a passive source such as solar panels 140 disposed on the roof of the trailer 112. Through configurations discussed further below, the propulsion power system 132 and auxiliary power system 122 exchange excess power for avoiding a power shortfall, for example on a cloudy day when the solar panels 140 are challenged but the vehicle 110 is traveling at highway speed and the alternator 132 is generating ample power.

The propulsion power system 134 is generally defined by the native vehicle charging and starting system on the vehicle 110, typically 12v. Since the alternator 132 often experiences substantial periods of limited draw, excess electrical power (energy) diverts to the auxiliary power system 122. The reverse may also be performed where excess solar generated power, stored in the batteries 120-99, may power the comfort station or other loads during stationary vehicle periods.

The auxiliary power system 122 includes the solar array 140 mounted on the roof of the trailer 112, and connects to an MPPT charger 142 for storing and distributing the solar generated power. The MPPT charger 142 directs and controls the solar panels for delivering a maximum voltage for charging. Generally, the propulsion power system 134 and the auxiliary power system 122 have different voltage characteristics. A programmable smart switch, or controller 150, converts electrical characteristics (current and voltage) to correspond to the trailer load 120 or the propulsion load 130, as determined by alternator charge logic 138 and solar charge logic 128. As depicted, the charge controller 160 includes the MPPT charger 142, the PSS 150 for directing and converting voltage using PWM (Pulse width modulation) and/or rectification, and alternator 138 and solar 128 charge logic for directing current to the respective batteries without overcharging and to promote battery longevity. In a typical configuration, the propulsion power system 134 operates on 12v and the auxiliary power system 122 employs the solar panel generation 140 between 12v and 48v. Dynamic switching and configuration of the solar panels 140 is discussed further in copending U.S. patent application Ser. No. 13/752,765, filed Jan. 29, 2013, entitled "METHOD AND APPARATUS FOR VEHICULAR ENERGY MANAGEMENT," incorporated herein by reference.

Voltage characteristics of the respective propulsion 134 and auxiliary 122 power systems include different voltages, as well as different charging patterns. The programmable smart switch 150 employs transformers and modulations to modify voltage to be consistent with the system 122, 134 being powered or charged (recall that the batteries 120-99 and 130-99 are also a load in the respective system). Electrical characteristics include current, voltage, and AC/DC. Generally, voltages should be substantially similar for cooperation between the difference systems. Charge voltages are typically about 10-20% higher than the demand voltage of the system they support, however different charge logic varies. Alternators, by definition, generate an AC signal, however this is rectified or modulated to DC at the alternator before entering the propulsion power system 132, which corresponds to the DC signal derived from the solar panels 140. The charge manager 160 or programmable smart switch 150, therefore, needs to transform the voltage to produce a current that is compatible to charge or supply loads of the demand system 122 or 134.

When both propulsion and auxiliary battery-charging systems are operational (such as during daylight driving for solar applications), they are mutually exclusive because of the difference in charge management schemes, e.g., PWM versus MPPT. The auxiliary charging system typically cannot support an active PWM system with excess auxiliary power using the standard charging algorithm. If it were possible, then excess auxiliary energy (power not needed to charge auxiliary batteries) would not only offset the primary battery charging requirement but would—by working in unison with the propulsion PWM system—offset the total electrical load to the extent of the excess auxiliary energy. Utilizing excess auxiliary energy in the propulsion electrical system offsets the alternator load and results in conservation of fuel and lowers operating costs.

Figure 3:
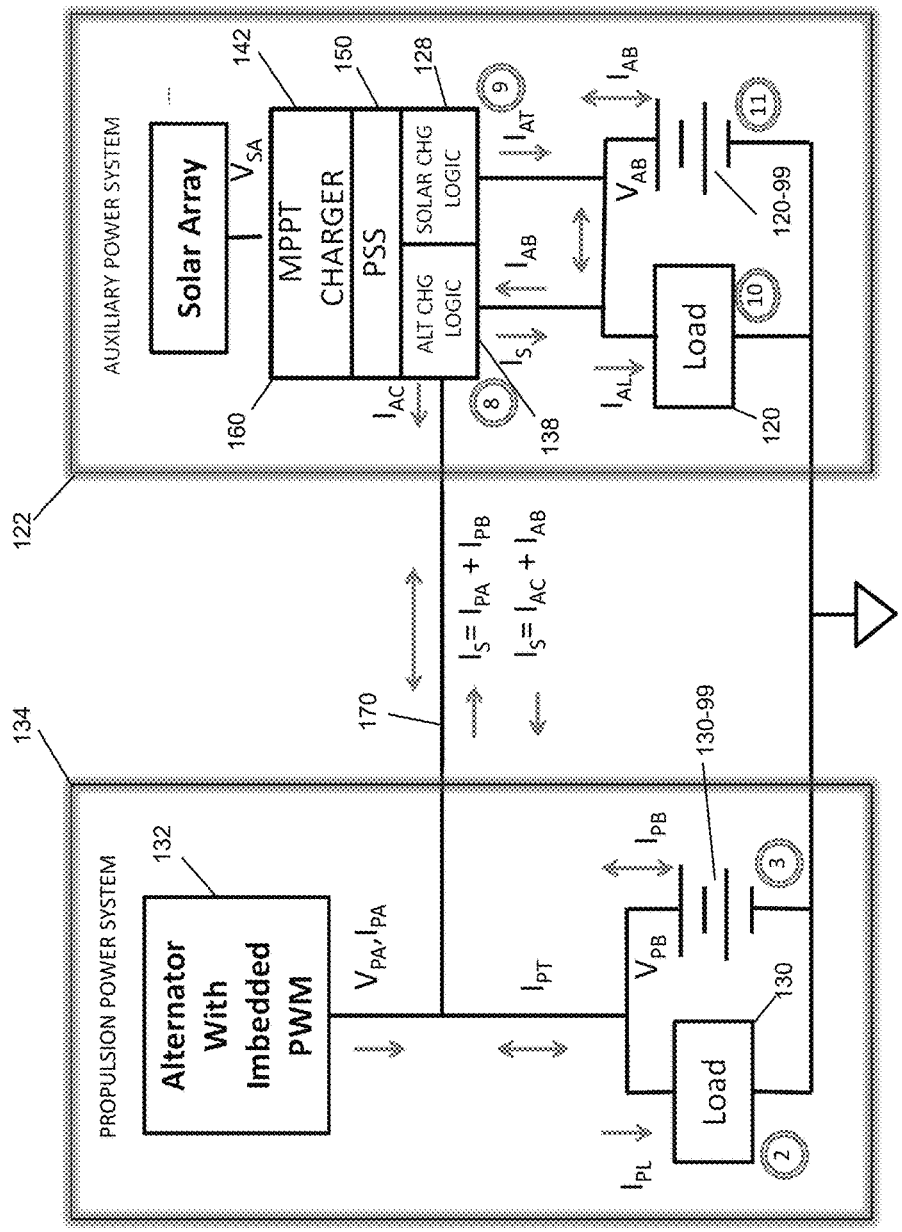
FIG. 3 shows a functional diagram of charge current flow in an integrated PWM (Pulse Width Modulation) and solar MPPT charging application.

FIG. 3 shows a Functional Diagram of charge current flow in an integrated PWM (Pulse Width Modulation) and solar MPPT charging application. The introduction of the Programmable Smart Switch (PSS), 150 included in the charge manager 160 shown in FIG. 3, will allow the two separate charging systems to employ excess energy while either or both systems are operating at the same time. Proper battery state-of-charge can be managed through automatic propulsion startup option and prolonged propulsion down time does not result in a depleted battery charge state. Excess energy from the APS is fully utilized, which can reduce fuel consumption and propulsion system maintenance costs.

In the general framework outlined herein, each of the charge loads has a corresponding charge source, and the charge logic is operable to determine if a charge load is satisfied, and directs the charge current from the charge source of the satisfied load to one of the other charge loads. For example, in a typical vehicle, the loads include a primary load, such that the primary load takes precedence to other loads for receiving charge current, and powers critical loads such as vehicle electronics. The charge source includes the native vehicle alternator (e.g., 12V) charging system and primary battery. The loads also include auxiliary consumers, such that the auxiliary consumers have intermittent and non-immediate needs for receiving charge current, for example a comfort HVAC system, refrigeration unit or liftgate with corresponding auxiliary battery system. Accordingly, the charge sources include an on-demand source and an intermittent source.

In the typical configuration, the auxiliary consumers such as comfort HVAC, refrigeration, or liftgate systems draw power first from the APS (e.g., solar PV panels and corresponding storage batteries), which is separate from the vehicle propulsion power system (the primary power system). The plurality of sources can include a PWM source and a MPPT source, where the PWM source can be a rotary powered alternator 132 and the MPPT source can be a solar system 140. Also, the on-demand source can be an internal combustion engine having an independent fuel source, and the intermittent source can be a solar PV panel, thus giving rise to the mutually exclusive charging mechanisms that the present approach seeks to interoperate.

In a particular configuration, the charge manager 160 includes a combination of a modified MPPT charger 142 and a separate programmable logic matrix that controls the energy flow between the APS and the propulsion power system. The PSS 150 uses various real time analog parameters and ampere-hour algorithms to manage battery state of charge (SOC) and battery operating voltage. An operator sets system operating limits (e.g., voltage and temperature) at installation, and also battery operating limits (e.g., ampere-hour capacities) to control and achieve maximum system efficiency for different battery chemistries. Alternatively, automated default or turnkey startup parameters may be provided with the option to override or modify.

Power management and battery charging are prioritized by the PSS 150 through sequencing by first directing all APS 122 energy to the auxiliary loads 120 and the auxiliary battery 120-99. Auxiliary loads are typically satisfied first since they are designed to be independent of the propulsion power system to conserve fuel consumption. Once the auxiliary power demand is satisfied, the PSS will direct excess energy from the APS to the propulsion power system using a modification of the APS charger to interface with the constant voltage primary electrical system while maintaining peak power tracking of the available solar energy.

Nighttime operation is also controlled by the PSS 150 through monitoring of the auxiliary battery 120-99 SOC. The auxiliary battery is the prime source of nighttime energy for auxiliary loads until a predetermined low SOC is detected. At that time the PSS 150 will redirect the propulsion power system 132 to support the auxiliary load through a set of logic switches until the load demand is satisfied including partial auxiliary battery recharge. If the propulsion power system is off, then the PSS 150 will start the propulsion power system 134 and then turn it off when the power management conditions are met, also known as auto-start capability. Thus, charge logic is operable to initiate the on-demand source if the auxiliary battery has an insufficient SOC.

The PSS is continuously monitoring both power systems operational status and auxiliary and primary battery charge states. During long, daylight non-powered idle periods 134, the PSS supports the primary system parasitic loads with solar power and maintains both the auxiliary and primary battery systems at a full SOC. Proper and constant battery charge management coupled with power management results in lower operational costs and prevents unplanned downtime due to reduced SOC.

In an implementation vehicle using such a system, consider that each battery is a load. These loads are in parallel with the power source and each power source circuit is separate with its own charge controller managing the voltage. At any one time these two power circuits are at different voltages. When we try to put each power circuit in parallel so that the one with extra power can contribute to the other, the charge controllers may become confused because the combined voltages will be driven to the same level per basic principles according to Ohm's Law.

This scenario identifies where the PSS 150 imbedded charge controller (or other suitable control logic) takes over while still being able to drive the solar array power source at the maximum power point. The charge manager 160 can sense the voltage state of each circuit and control the current distribution at the separate circuit voltage level even though these voltages are constantly changing do to other load influences in parallel with the separate batteries, i.e. Auxiliary HVAC cycling, lift gate operation or a primary load like wipers, turn signals or even an electrical clutch on the engine air conditioner cycling.

If the auxiliary battery voltage is 1 to 1.5 volts lower when the primary power source is connected to the auxiliary circuit, the higher alternator reference voltage will force both circuits to seek the higher voltage since it is the stronger element and the auxiliary MPPT charger 142 will essentially shut down with the loss of the solar power. The PSS 150 manages these voltage differences so that all of the available solar power is utilized for both power circuits at the same time, thus reducing demand on the alternator and subsequently fuel consumption. Of course at night the PSS uses the alternator to support the auxiliary circuit when the auxiliary battery is near depletion.

Configurations disclosed herein perform management of the differing voltages of the primary and auxiliary systems and managing two paralleled separate power sources with independent battery load controllers to continue to utilize the MPPT function of one of the charge controllers. Contributing loads are in parallel across the power sources and, an integration of two separate power circuits in parallel may cause undesired operation without the PSS logic controller for identifying and directing current flow in conjunction with varying voltage sources.

A system operator, such as a driver or maintenance personnel, may choose to set the propulsion system as the principal power source if conditions (e.g., weather) or operational timing suggest that the system operation would be more effective. In this scenario, the PSS uses a combination of the propulsion and auxiliary power to meet all load demands including auxiliary battery recharge. If the system is operating when the both the propulsion power system and APS are under producing (e.g., night rest period), the PSS will use power from the primary battery until the primary battery drops to a preselected SOC. At that time the primary battery is disconnected and the auxiliary battery assumes all load demand until it reaches a preselected SOC. When both battery systems are at a preselected lower SOC, then the PSS starts the propulsion system to provide alternator power for the loads and to begin battery recharge until a new, higher logic point SOC is achieved. The battery discharge cycle then repeats.

If the charge controller is operating when the APS is producing sufficient power (e.g., solar system in a daylight environment), the cycle logic is the same except when the load demand is satisfied or removed, the APS will support battery maintenance charging without the need for propulsion power.

Referring to FIG. 1, in an example configuration, a vehicle charge management system including the disclosed charge controller provides the following advantages:

Charge energy management between two (or more) different power sources and battery charge management systems;
Automatically maintains battery SOC during long storage periods for each power system;
Prioritizes energy utilization;
Maximizes use of all excess APS energy for battery charging and offsetting load demands;
Reduces fuel consumption;
Versatile operation through user defined operating parameters and battery chemistry;
Continuous battery SOC monitoring and charge maintenance during primary power system non-operational periods; and
Helps prevent unplanned loss of power system operation.

Functional diagrams of an integrated Primary Power System PWM and solar APS MPPT charging system are shown in FIGS. 2 and 3. Referring to FIGS. 2 and 3, the PSS 150 is integrated into the MPPT Solar Charge Charge manager 160 to allow for seamless sharing of solar energy between two different battery charge management systems while forcing the solar power source (array) 140 to operate at a maximum power operating point. The PSS 150 senses both battery system voltages, i.e., $V_{AB}$ (11) and $V_{PB}$ (3), and solar power voltage to establish a power distribution requirement, and then the PSS 150 manages the amount of battery charge current, i.e., $I_{AB}$ and $I_{PB}$, to control battery SOCs. The auxiliary battery 120-99, charging through the Solar Charge Logic 128, interface uses a well-defined, industry based battery charge profile scheme of charging to a controlled maximum voltage followed by a constant voltage charge period and then a maintenance charge to prevent self-discharge. Maximum battery energy utilization and extended cycle life are achieved with this battery-charging scenario.

When the PSS 150 senses that the APS has excess power, it will divert current, i.e., $I_S$ (4) over interconnection 170 through the alternator charge logic 138 while maintaining load and battery charging support to the APS. The alternator charge logic 138 modifies and controls the excess solar power to operate at the alternator 132 with Imbedded PWM control voltage, i.e., $V_{P4}$, to deliver load current, i.e., $I_{PL}$, and primary battery 130-99 current, i.e., $I_{PB}$, to the primary power system 134. In this approach, charge logic is configured to transfer charge current to the vehicle/alternator system by direct charge current from the intermittent source to the auxiliary consumers and determine that the auxiliary consumers and the corresponding battery are satisfied. The charge charge manager 160 converts the excess charge current into a form expected by the primary load 130 to accommodate the differences between the PWM and MPPT signals, and directs the charge current from the intermittent (auxiliary) source 140 to the primary load 130 and corresponding battery 130-99.

Power distribution between the two different power systems is also shown in the Functional Diagram of FIG. 3. The propulsion system alternator 132 with Imbedded PWM provides current at a fixed voltage, i.e., $V_{P4}$, to the propulsion system load 130 and the primary battery 130-99 while the propulsion system 134 is operating either in an idle state or on the highway at a higher engine rpm. When the primary battery 130-99 reaches a full SOC, the PWM charge controller, integral to the engine alternator 132, will reduce battery charge current to prevent an unwanted overvoltage condition. The PWM will control all current flow using a fixed, factory preset, voltage reference, i.e., $V_{P4}$. If the SOC conditions in the APS as defined by the PSS require external load/charge power support, then the PSS will set Alternator Charge Logic to pass current, i.e., $I_S$ into the APS using the voltage control reference of the PWM regulator.

In this manner, the charge manager 160 identifies when a primary load is satisfied from a primary source, and identifies electrical characteristics of an auxiliary load. The controller then converts excess power from the primary source to correspond to the identified electrical characteristics. In the example configuration employing a tractor trailertransport vehicle, the primary load is s battery and is satisfied upon achieving a maximum state of charge (SOC). Therefore, the charge logic is further configured to transfer charge current to the auxiliary loads 120 by directing charge current from the on-demand source to the primary load and detect an overvoltage condition pending due to a SOC of the battery corresponding to the primary load. The charge logic determines if the auxiliary load has a SOC for absorbing charge current, and directs charge current from the on-demand source to the auxiliary consumers. Further, in configurations herein, the charge logic is operable to initiate the on-demand source if the battery has an insufficient SOC. In other words, the charge controller can start the primary system to initiate the on-demand charge source if the auxiliary source (battery) supporting an auxiliary load depleted, e.g., refrigeration unit is dying, thus preventing cargo spoilage.

Figure 4:
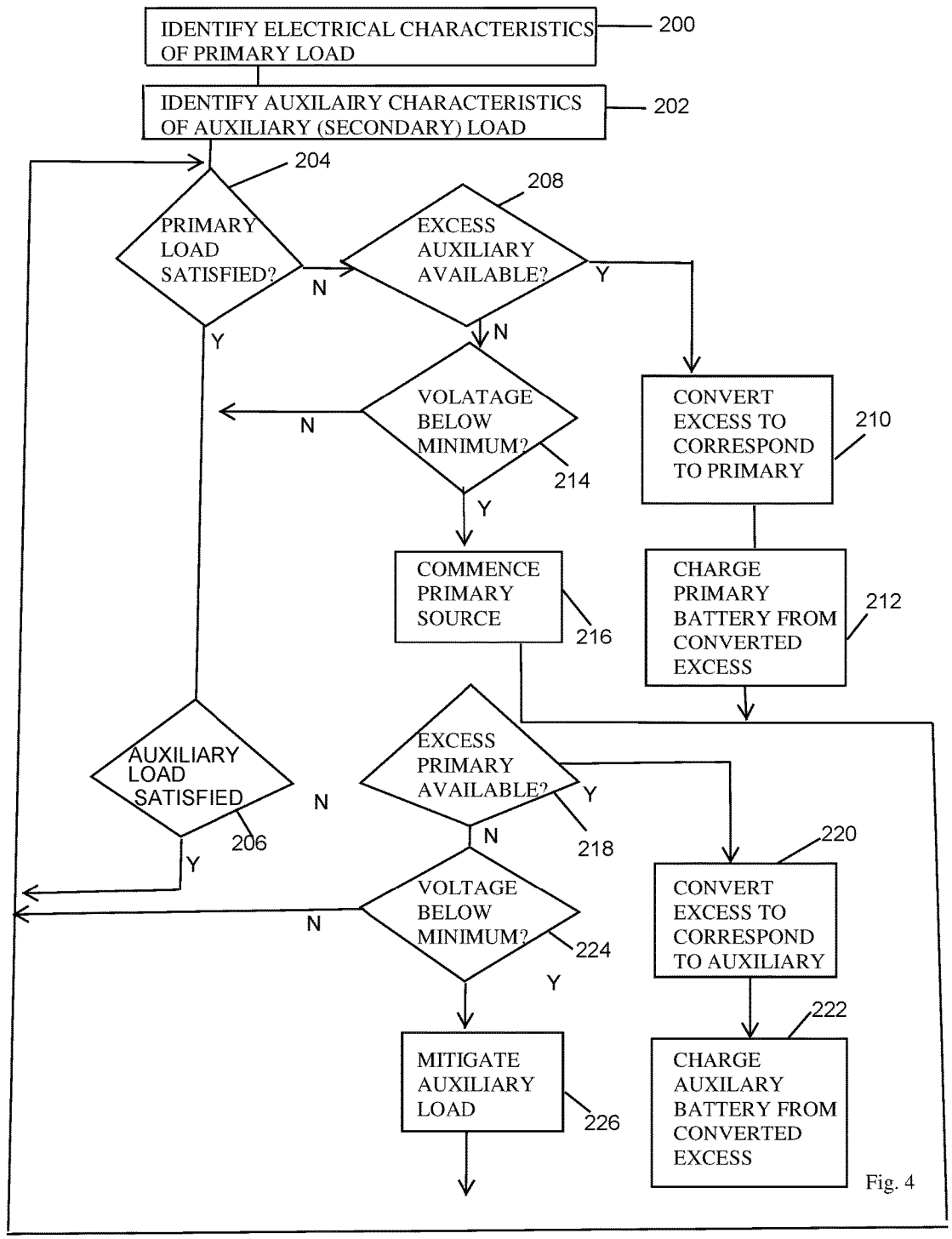
FIG. 4 is a flowchart of charge logic in the auxiliary power system of FIG. 3

FIG. 4 is a flowchart of one example of charge logic in the auxiliary power system of FIG. 3. It should be emphasized that configurations herein are directed to establishing and maintain a priority of loads of different electrical characteristics to permit receiving a voltage and current corresponding to a first voltage characteristic and output a converted voltage and current corresponding to a second voltage characteristic, and that the disclosed flowchart is one particular approach that may be employed to accomplish this end. Referring to FIGS. 3 and 4, at step 200 identifying voltage characteristics of a vehicle primary load, in which the primary load includes a storage element or battery operable for starting the vehicle. The primary load is operable to be powered by the propulsion power system 134, and includes the vehicle starter 130-1. The controller 142 identifies voltage characteristics of an auxiliary source provided by an auxiliary power system, in which the auxiliary power system 122 includes at least one passive source such as solar panels 140, as depicted at step 202. The PSS 150 enters a control loop to poll or check the auxiliary systems and identify if switching charge capacity is appropriate. A check is performed, at step 204, to determine if the vehicle primary loads are satisfied. The primary loads include the starting battery, and other loads such as lights and fuel pumps employed for vehicle propulsion. If the primary loads 130 are satisfied, a further check is performed, at step 206, to identify if the auxiliary loads 120 are satisfied.

If the primary load is not satisfied, such as a weakening starting battery from operating a comfort station, then a check is performed, at step 208, to determine if excess power is available from the auxiliary power system 122. If so, the PSS 150 converts, if a primary load is not satisfied and an auxiliary source has available excess power, the electrical characteristics of the available excess power to correspond to the primary load, as depicted at step 210, and directs the converted excess power to the primary load, as shown at step 212, to bring the primary battery 130-99 back to full charge.

If excess power is not available, then a check is performed, at step 214, to determine if the voltage of the primary battery 130-99 is below minimum. If so, then the propulsion power system commences the primary source by starting the diesel engine to invoke the alternator 132, as depicted at step 216. It is generally preferable to employ the diesel engine as a fallback for use only when other sources (i.e. shore power, auxiliary power) have been exhausted.

If, at step 206, the auxiliary load is not satisfied, such as insufficient comfort station HVAC performance, then the PSS 150 checks to see if there is excess power available in the propulsion power system, as shown at step 218. The controller converts, if an auxiliary load is not satisfied and a primary source has available excess power, the electrical characteristics of the available excess power to correspond to the auxiliary load, as shown at step 220, and directing the converted excess power to the auxiliary load, as disclosed at step 222. Note that this may subsequently result in starting the diesel engine at step 216 to effectively allow the vehicle alternator 132 to power the reefer load and avoid cargo loss.

If the propulsion power system 134 does not have available excess, then a check is performed, at step 224, to determine if the auxiliary voltage is below a minimum. If so, then the controller mitigates the auxiliary load, as depicted at step 226, by shutdown of loads 120 or commencing the primary source as described above, if possible.

The charge logic maintains a state of charge of each battery by directing the charge current to a controlled maximum, followed by a constant charge, and followed by a maintenance charge sufficient to prevent charge depletion of each battery.

Power management is achieved using an ampere-hour counting system as part of the PSS 150 controlling logic. Both charge and discharge currents, $I_{AB}$ and $I_{PB}$ are measured and time logged. Minimum SOC references are compared to real time battery SOCs. If a minimum SOC reference is met, then the PSS will take action to reduce the affected battery load, remove the affected battery load or redirect available Primary or APS energy to prevent further battery energy losses.

The PSS integrated MPPT Solar Charge Controller is capable of seamlessly sharing excess solar energy between two different battery charging control systems. Using specialized control logic schemes and energy management logic, both power system battery energy states are maintained and controlled for maximum energy utilization and minimal lifecycle stress. Operational efficiencies are achieved through fuel conservation while user interface logic options maximize versatility and simplicity.

While the system and apparatus has been particularly shown and described with references to embodiments thereof, it will be understood by those skilled in the art that various changes in form and details may be made therein without departing from the scope of the invention encompassed by the appended claims.

What is claimed is:

1. In a vehicle electrical system including at least one passive source and a primary load, a method of maintaining vehicle electrical loads, comprising:
    identifying voltage characteristics of a vehicle primary load, the primary load including a storage element operable for starting the vehicle;
    identifying voltage characteristics of an auxiliary source provided by an auxiliary power system, the auxiliary power system including at least one passive source;
    converting, if an auxiliary load is not satisfied and a primary source has available excess power, the electrical characteristics of the available excess power to correspond to the auxiliary load; and
    directing the converted excess power to the auxiliary load.

2. The method of claim 1 further comprising:
    converting, if a primary load is not satisfied and an auxiliary source has available excess power, the electrical characteristics of the available excess power to correspond to the primary load; and
    directing the converted excess power to the primary load.

3. The method of claim 1 further comprising identifying when a primary load is satisfied from a primary source;
    identifying electrical characteristics of an auxiliary load;
    converting excess power from the primary source to correspond to the identified electrical characteristics.

4. The method of claim 3 wherein the primary load is s battery and is satisfied upon achieving a maximum state of charge (SOC).

5. A charge controller comprising:
    an interface to a plurality of charge sources;
    an interface to a plurality of charge loads;
    charge logic for computing which of the plurality of sources to supply the charge current and which of the plurality of loads receive the charge current; and
    a switch responsive to the charge logic for directing the charge current from at least one of the plurality of sources to at least one of the plurality of loads, the plurality of charge sources having different voltage characteristics for powering a common load.

6. The controller of claim 5 wherein each of the charge loads has a corresponding charge source, and the charge logic is operable to:
    determine if a charge load is satisfied; and
    direct the charge current from the charge source of the satisfied load to one of the other charge loads of the plurality of charge loads.

7. The controller of claim 6 wherein the charge sources include an on-demand source and an intermittent source, and each of the charge loads include a corresponding battery.

8. The controller of claim 7 wherein the charge logic is operable to initiate the on-demand source if the battery has an insufficient state of charge (SOC).

9. The controller of claim 8 wherein the on-demand source is an internal combustion engine having an independent fuel source, and the intermittent source is a solar PV panel.

10. The controller of claim 8 wherein the charge logic maintains a SOC of the battery by directing the charge current to a controlled maximum, followed by a constant charge, and followed by a maintenance charge sufficient to prevent charge depletion of the battery.

11. The controller of claim 6 wherein the plurality of loads includes a primary load, the primary load taking precedence to other loads for receiving charge.

12. The controller of claim 11 wherein the loads include auxiliary consumers, the auxiliary consumers having intermittent and non-immediate needs for receiving charge current.

13. The controller of claim 12 wherein the charge logic is configured to:
   direct charge current from the intermittent source to the auxiliary consumers;
   determine that the auxiliary consumers and the corresponding battery are satisfied;
   convert the charge voltage into a form expected by the primary load; and
   direct the charge current from the intermittent source to the primary load and corresponding battery.

14. The controller of claim 12 wherein the charge logic is configured to:
   direct charge current from the on-demand source to the primary load;
   detect an overvoltage condition pending due to a SOC of the battery corresponding to the primary load;
   determine if the auxiliary load has a SOC for absorbing charge current;
   convert the charge voltage into a form expected by the auxiliary load; and
   direct charge current from the on-demand source to the auxiliary consumers.

15. The controller of claim 11 wherein the auxiliary load includes a refrigeration system for perishable cargo.

16. The controller of claim 5 wherein the plurality of sources include a PWM (Pulse Width Modulated) source and an MPPT (Maximum Power Point Tracking) source.

17. The controller of claim 5 wherein the PWM source is a rotary powered alternator and the MPPT source is a solar panel.

18. A system for switching electrical sources in a vehicle electrical system having a native electrical source and a passive electrical source, comprising:
   charge logic for identifying differing electrical characteristics between a first power source and a second power sources;
   a controller for converting power corresponding to electrical characteristics of the first power source to correspond to electrical characteristics of the second power source for charging the second storage element from the first power source;
   a switch responsive to the charge logic for switching the converted power to the second storage element such that unmatched power sources defined by differing electrical characteristics maintain electrical separation.

19. The system of claim 18 wherein the first power source and second power source are mutually exclusive of simultaneously powering a common load.

20. The system of claim 19 wherein the controller includes a programmable smart switch adapted to receive a voltage and current corresponding to a first voltage characteristic and output a converted voltage and current corresponding to a second voltage characteristic.

* * * * *